Figure 1:
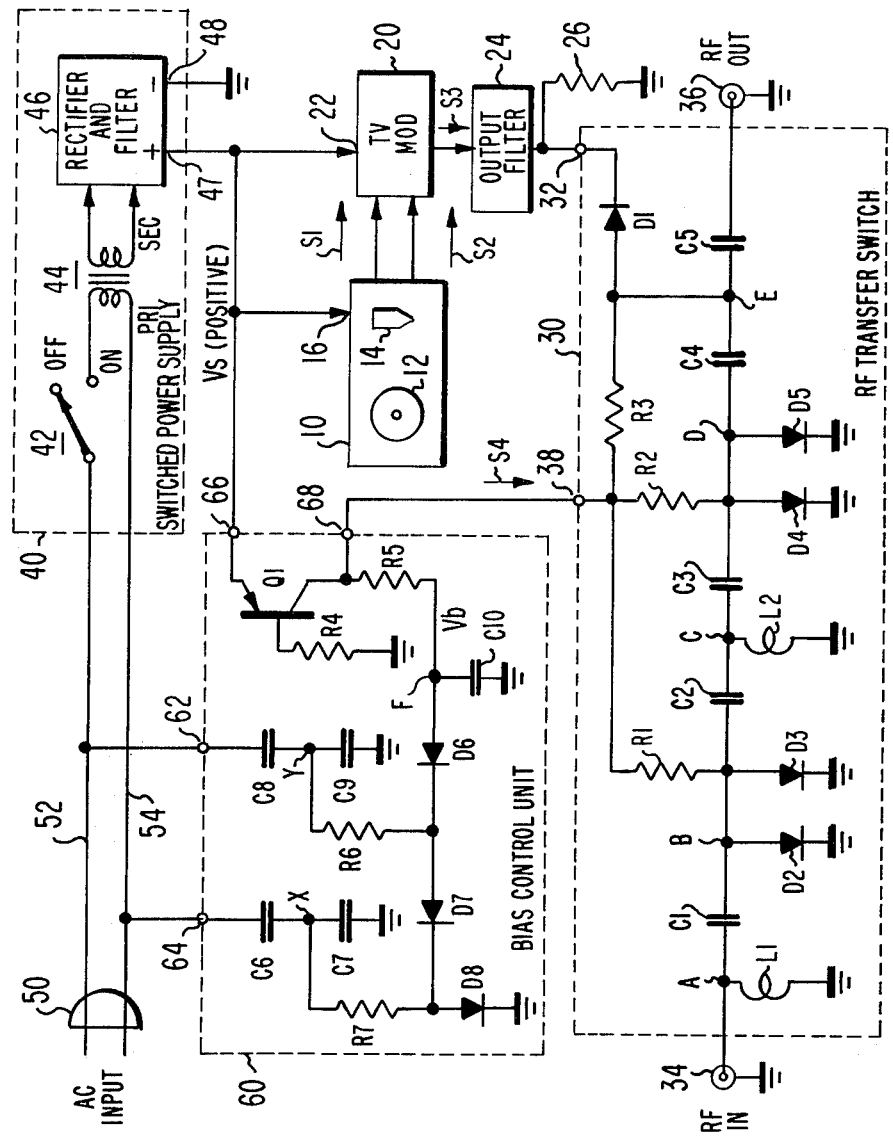

United States Patent [19]

Lambert et al.

[11] 4,432,015
[45] Feb. 14, 1984

[54] VIDEO APPARATUS HAVING IMPROVED ANTENNA TRANSFER SWITCHING SYSTEM

[75] Inventors: Eber F. Lambert; Todd J. Christopher, both of Indianapolis, Ind.

[73] Assignee: RCA Corporation, New York, N.Y.

[21] Appl. No.: 379,095

[22] Filed: May 17, 1982

[51] Int. Cl.³ .............................................. H04N 5/48
[52] U.S. Cl. .................................... 358/181; 455/133
[58] Field of Search ...................... 358/181, 183, 188; 328/137, 104, 97, 154; 455/133-135; 307/243, 244, 256, 259

[56] References Cited

U.S. PATENT DOCUMENTS

| | | | |
|---|---|---|---|
| 3,860,951 | 1/1975 | Camras | 358/4 |
| 4,097,899 | 6/1978 | Yu | 358/181 |
| 4,361,854 | 11/1982 | Wolfe | 358/181 |
| 4,363,033 | 12/1982 | Lovely | 358/181 |
| 4,386,377 | 5/1983 | Hunter | 358/335 |
| 4,400,735 | 8/1983 | Strammello, Jr. | 358/181 |

*Primary Examiner*—Michael A. Masinick
*Attorney, Agent, or Firm*—E. M. Whitacre; W. H. Meise; R. G. Coalter

[57] ABSTRACT

RF switching diodes in the antenna transfer switch of a video disc player are reverse biased by means of a bias supply when the main power supply of the player is turned off. The reverse bias counteracts any tendency for RF signals applied to the player antenna input connector from forward biasing the diodes which otherwise could result in intermodulation distortion of antenna input signals coupled to the player RF output connector. The effect of the reverse bias is augmented by a high pass filter in the antenna transfer switch which attenuates RF input signals at frequencies below the lowest assigned television channel frequency.

12 Claims, 2 Drawing Figures

VIDEO APPARATUS HAVING IMPROVED ANTENNA TRANSFER SWITCHING SYSTEM

This invention relates to video apparatus and particularly to improved RF switching arrangements for facilitating convenient interconnections between the apparatus, other video information sources and a utilization device such as a television receiver.

A wide variety of video devices for use with conventional television receivers are commercially available. Examples include video disc players, video tape recorders, video game units, home computers and the like. To facilitate use of such equipment without the necessity of modifying the receiver, it is conventional practice to include an RF modulator in the device for providing an RF output signal on one (or more) TV channels so that the device may be connected directly to the antenna input terminals of the receiver.

At times the receiver may be used for viewing broadcast television programs received from an antenna or cable and at other times it may be used for display of the signal provided by the video device. To avoid the inconvenience of manually changing (i.e., re-wiring) the antenna connection of the receiver, some of the known video devices include a switch which connects the TV receiver antenna input to the device when the device is operating and which transfers the TV antenna connection to an external antenna (or other video source) when the device is not being operated. Such switches are commonly known as antenna or "RF" (radio frequency) transfer switches.

Video devices which employ mechanical antenna transfer switches are commercially available. Mechanical switches may be designed to exhibit minimal capacitive coupling and a low "ON" resistance. These switches are capable of providing very high attenuation of the un-selected signal and very low attenuation of the selected RF signal. Mechanical switches, however, may be subject to contact contamination problems and are generally less reliable than electronic switches.

In certain applications it may be desired to provide electronic control of an antenna transfer switch. It is known that a semiconductor diode may be used to couple RF circuits when suitably forward biased and diodes are not subject to the contact contamination problems of mechanical switches. Diodes, however, exhibit a relatively high capacitance when in an unbiased state and thus are less satisfactory as RF switches in that regard than mechanical switches. Diode switches are also subject to problems with regard to signal distortion (due to their nonlinear transfer characteristics) and may, under certain conditions, tend to be turned on by any high level RF signal present at the input including those intended to be attenuated. This, in turn, can lead to problems with intermodulation distortion. To a certain extent, these problems may be overcome by means of a combination of diode switches and reed relays. An example of such a "hybrid" antenna transfer switch is described in U.S. Pat. No. 4,097,899 entitled "VIDEO RECORD PLAYER SWITCHING SYSTEM" which issued to J. P. Yu June 27, 1978. A reed relay, although electronically controllable, is essentially a mechanical device and subject to certain problems such as contact sticking, breakage during assembly, etc. In addition to presenting problems with reliability and lack of ruggedness, reed relays also are relatively expensive and bulky.

The present invention is directed to meeting the need for apparatus in which RF switching may be controlled electronically and in which switching parameters such as isolation, transmission, distortion and reliability are improved.

Apparatus embodying the invention includes power supply means for receiving an A.C. supply voltage and providing a D.C. output voltage upon closure of a power on-off switch means therein. The D.C. output voltage is applied to a signal source means which produces an RF output signal. An RF transfer switch means provides a first circuit path for coupling the RF output signal to an RF output connector and a second circuit path for coupling an RF input connector to the RF output connector, each of the circuit paths including at least one semiconductor switching means. A control means applies a turn-on bias signal to each of the semiconductor switching means when the power on-off switch means is in a closed condition and applies a turn-off bias signal to each of the semiconductor switching means when the power on-off switch means is in an open condition.

In accordance with a further aspect of the invention, the second circuit path includes a high pass filter means.

Figure 2:
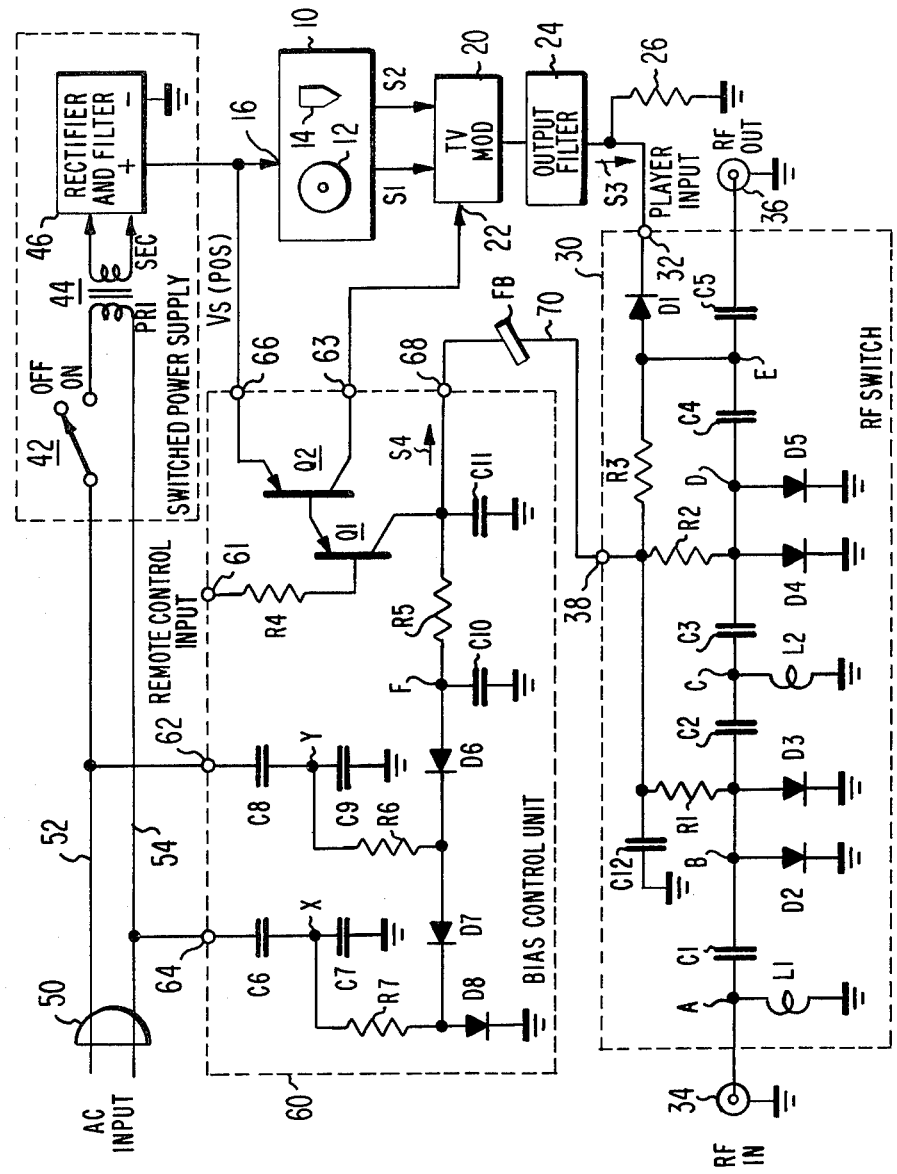

The foregoing and further features of the invention are illustrated in the accompanying drawings wherein like elements are identified by like reference designators and in which:

FIG. 1 is a schematic diagram, partially in block form, of a video disc player embodying the invention; and FIG. 2 illustrates certain modifications of the player of FIG. 1.

The video disc player illustrated in FIG. 1 includes a signal recovery unit 10 comprising a turntable 12 for rotating a video disc record, a pickup transducer 14 for recovering information signals from the record and processing circuits (not shown) for deriving baseband audio and video output signals, S1 and S2, from the recovered information signals when a record is being played. The recovery unit also includes an input 16 coupled to receive a source of positive supply voltage, Vs, for powering the signal processing circuits when the player is in operation. Such recovery units are well known in the art.

The baseband signals S1 and S2 are applied to the sound and picture modulation input terminals of a television modulator 20 which has a power input terminal 22 coupled to receive the D.C. supply voltage Vs. When Vs is present, unit 10 produces the baseband signals S1 and S2 and modulator 20 provides an RF output signal, S3, within a selected television broadcast band and having sound and picture components modulated by the baseband signals.

The RF signal S3 is applied to an output filter 24 to confine the spectrum of the signal to a desired broadcast standard (e.g. NTSC, PAL, SECAM etc). U.S. Pat. No. 4,097,899 of J. P. Yu describes a "transmitter" and vestigial sideband filter suitable for use as modulator 20 and filter 24. The Yu filter includes a D.C. path to ground in its output circuit. Another suitable modulator and output filter is described in the U.S. Pat. No. 4,386,377 of R. E. Hunter, Jr., entitled "TV INTERFACE RF MODULATION CIRCUITRY". The Hunter output filter does not include a D.C. path to ground at its output but such a path may be obtained by terminating the filter with a resistor 26 (or other suitable direct current conductive element) as shown. As will be explained in detail subsequently, the use of a modulator of the type having an RF output filter with a D.C. path to ground (or some other suitable reference potential point) facilitates application of turn-on and turn-off bias to a semiconductor device in the RF transfer switch (30) of the apparatus.

The output of filter 24 is coupled to an RF input terminal 32 of an RF transfer switch 30 which selectively couples terminal 32 and an RF input connector 34 to an RF output connector 36 in accordance with the state of a bipolar control signal S4 applied to a control terminal 38 of the switch. The term "bipolar", as used herein, means that the signal S4 has two possible polarities or "states" taken with respect to a reference ground potential point. When signal S4 is positive, a first circuit path is completed between terminal 32 and connector 36 and a second circuit path between connectors 34 and 36 is interrupted. Conversely, when signal S4 is negative (with respect to ground) the first circuit path is interrupted and the second path is completed. Connector 34 is provided to receive an RF input signal from a suitable source such as an antenna, a video tape player or the like, and connector 36 is provided for connection to a utilization device such as a television receiver or some other suitable device.

Turning now to the details of switch 30, the second circuit path referred to includes a high pass filter comprising five capacitors, (C1-C5), connected in series, in that order, between connectors 34 and 36. An inductor, L1, is connected between ground and the input node "A" of the high pass filter (i.e., RF connector 34). An inductor, L2, is connected between an internal node "C" of the filter and ground. Node "C" corresponds to the common connection of capacitors C2 and C3. The odd numbered capacitors (C1, C3 and C5) are not part of the frequency determining elements of the filter but are included to provide the function of D.C. blocking to facilitate forward and reverse biasing of semiconductor devices in the filter.

The filter cut-off frequency is selected to be below the lowest standard TV channel broadcast frequency. In the United States of America, a suitable choice of cut-off frequency is about 40 MHz (which is less than the TV channel 2 frequency allocation but substantially higher than the frequencies assigned to standard long wave radio broadcast stations. The reasons for selecting a cut-off frequency in this range will be discussed subsequently. Suitable values for the filter elements (and the blocking capacitors) are: C1=C3=C5=0.001 microfarad; C2=C4=33 picofarads; L1=1 micro-Henry; and L2=22 micro-Henries.

The first circuit path of switch 30 comprises a series connection of capacitor C5 and a semiconductor device, diode D1. The cathode of diode D1 is connected to terminal 32 and the anode of diode D1 is connected to the common connection (node E) of capacitors C4 and C5. When diode D1 is forward biased, the first circuit path is completed (diode D1 turned on) and the RF signal S3 is coupled from input terminal 32 to the output connector 36. Conversely, when diode D1 is reverse biased, the first circuit path D1-C5 is interrupted by the turn-off of diode D1. Advantageously, the presence of reverse bias on diode D1 prevents any tendency of the diode to be turned on due to the presence any RF signal or noise signal which may be present either at terminal 32 or at node E.

The second circuit path of switch 30 includes a plurality of semiconductor switching devices (diodes D2-D5) arranged in a shunt relationship (rather than a series relationship) with the path. Specifically, diodes D2 and D3 are connected between node B and ground and diodes D4 and D5 are connected between node D and ground, each of diodes D2-D5 being poled in the same sense with respect to ground as diode D1. When forward biased, diodes D2-D5 interrupt the second circuit path by shunting any RF signal (or noise) present in the path to ground. Conversely, when reverse biased, diodes D2-D5 complete the second circuit path by turning off and thus removing the shunt path to ground. As in the case with diode D1, the presence of the reverse bias on diodes D2-D5 prevents any tendency for the diodes to turn on in response to the RF signals or noise which may be present at nodes B and D.

The use of reverse bias to minimize any tendency of diodes D2-D5 to turn on due to RF signals or noise in the second circuit path is further augmented by the high pass filter in the second circuit path. As previously mentioned, the filter element values are selected to provide a cut off frequency below TV channel 2, but greater than that of standard long (or short) wave broadcast stations. This frequency choice greatly attenuates signals from local radio stations which may be picked up by an antenna coupled to connector 34. Such signals may be quite large and tend to counteract the reverse bias, applied to diodes D2-D5. This possibility is minimized by high pass filtering which also advantageously reduces the amount of reverse bias required keep diodes D2-D5 fully off. Thus, filtering in the second circuit path enhances the reliability of the RF switch in environments of high RF signal or noise levels.

Switch 30 is controlled by applying forward bias current to all of the diodes D1-D5 when the bipolar control signal S4 is of a given polarity (e.g., positive) and applying reverse bias to all of the diodes when signal S4 is of the opposite polarity (e.g., negative). The forward and reverse bias currents are distributed to the diodes by means of resistors R1, R2 and R3 connected between control terminal 38 and nodes B, D and E, respectively. Nodes B and D have two switching diodes each, to provide improved attenuation in the second circuit path of switch 30 when the diodes are forward biased. This is desirable for two reasons. First, relatively high attenuation in the second circuit path minimizes "backward radiation" of the signal S3 which otherwise might interfere with a cable system or be coupled to an antenna connected to input 34. Second, when connector 34 is coupled to a high level RF signal source, relatively high attenuation in the second circuit path minimizes any tendency of the high level RF source to interfere with the signal S3.

Where the number of diodes differs at different circuit nodes (as in switch 30), it is desirable to equalize the diode junction current densities when the diodes are in a forward biased condition. This improves factors such as the uniformity and predictability of the diode conductance characteristics and the overall attenuation and transmission characteristics of the RF transfer switch. The desired equalization may be achieved by appropriately scaling the values of resistors R1-R3. As an example, in the case where diodes D1-D5 are substantially identical (e.g., all of the same type number) one may assume that they will have substantially similar junction areas. For such a case, the current density of all diodes of switch 30 will be equalized if the values of resistor R1 and R2 are selected to be about half the value of resistor R3. Illustrative values are 1500 ohms for resistor R1 and R2 and 2700 ohms for resistor R3.

It is a further feature of RF transfer switch 30 that the high pass filter in the second circuit path (the path between connectors 34 and 36) is selected to be of the inductor input type rather than of the capacitor input type. By this means, static charges which may be present on a TV antenna coupled to connector 34 are automatically discharged to ground (via inductor L1) when the connection is made thereby eliminating a potential shock hazard as well as providing a measure of protection for the RF switching diodes from excessively high voltages. If a capacitor input form of high pass filter is used instead, then it is desirable to provide a static drain for connector 34. A resistor or a radio frequency choke (RFC) would be suitable for this purpose.

The positive supply voltage, Vs, for baseband signal source unit 10 and TV modulator 20 is provided by switched power supply 40, (outlined in phantom) which includes a power on-off switch 42, a voltage step down transformer 44 and a rectifier and filter unit 46. The primary winding of transformer 44 is coupled via conductors 52 and 54 to an A.C. power input connector 50 with switch 42 connected in series with conductor 52. Connector (or power "plug") 50 is connected to an A.C. power outlet in normal use of the apparatus so that transformer 44 is energized upon closure of switch 42 and de-energized when switch 42 is opened. The secondary winding of transformer 44 is connected to the input of rectifier and filter unit 46 which converts the A.C. input voltage to a smoothed D.C. output voltage (Vs) at terminals 47 and 48. Terminal 48, (the negative output) is grounded and terminal 47 (the positive output) is connected to baseband signal source unit 10 and TV modulator 20. Accordingly, upon closure of switch 42 source 10 and modulator 20 are energized and produce the RF output signal S3 as previously explained.

The control signal S4 for RF transfer switch 30 is produced by power supply 40 in conjunction with a bias control unit 60. Whenever the supply voltage Vs is present (switch 42 closed), signal S3 is produced and unit 60 couples Vs to control terminal 38 thereby forward biasing each of diodes D1-D5. The forward bias completes the first circuit path between connector 36 and terminal 32 and interrupts the second circuit path between connectors 34 and 36 as previously explained. As a result, the signal S3 is coupled to RF output terminal 36 to the exclusion of any signal which may be present at connector 34 and may be monitored by a television receiver coupled to connector 36. Conversely, when Vs is not present (switch 42 open), unit 60 supplies a negative bias voltage (Vb) to terminal 38 thereby reverse biasing each of diodes D1-D5. The reverse bias interrupts the first circuit path and completes the second circuit path in switch 30 as previously explained. In this mode, an external signal source (e.g. an antenna, etc.) will be coupled through switch 30 for display on the receiver.

Considering now the details of unit 60, the unit includes a pair of A.C. input terminals 62 and 64 coupled to respective ones of conductors 52 and 54 for continuously receiving a source of A.C. power, a D.C. input terminal 66 connected to receive the positive supply voltage Vs and an output terminal 68 connected to supply the bipolar control signal S4 to control terminal 38 of the RF transfer switch 30. Terminals 66 and 68 are connected to the emitter and collector electrodes, respectively, of a PNP transistor Q1 having a base electrode coupled to ground via a resistor R4. When the positive power supply voltage Vs is present, resistor R4 applies forward bias current to the base-emitter junction of transistor Q1 thereby turning transistor Q1 on which couples terminal 68 to terminal 66. Conversely, when supply voltage Vs is absent (i.e., at ground level), resistor R4 turns transistor Q1 off thereby decoupling terminal 66 from terminal 68. In effect, transistor Q1 provides the function of sensing the position of switch 42 to control the coupling of terminals 66 and 68. Mechanical alternatives would be to replace transistor Q1 and resistor R4 with a relay controlled by supply 40 or with an extra single pole single throw switch section added to switch 42. Such alternatives are less satisfactory in terms of cost, reliability and bulk than the use of a semiconductor switch (Q1) as shown.

The remaining elements of unit 60 comprise a source for continuously providing a negative output voltage, Vb at an output node F, and a current limiter for coupling the voltage Vb to terminal 68. The current limiting is provided by resistor R5 coupled between node F and terminal 68. Since the "on" resistance of transistor Q1 is very low (e.g., its saturation resistance), terminal 68 is effectively "clamped" to the potential of terminal 66 whenever transistor Q1 is turned on whereby signal S4 assumes a positive potential substantially equal to Vs. In this condition, resistor R5 limits current flow to node F thereby preventing a short circuit of the Vb and Vs supplies. Since, the full potential difference between Vb and Vs appears across resistor R5, it is desirable that its resistance value be selected to be relatively high (e.g., 33K-ohms or so) so as to minimize circuit power dissipation. When transistor Q1 is off (Vs=0) the path between terminals 66 and 68 is essentially an open circuit whereupon a negative output voltage is produced at terminal 68 equal to Vb less any voltage drop appearing across resistor R5. This voltage drop is very small since in this condition the current through resistor R5 equals only the sum of the leakage currents of diodes D1-D5. As a result, essentially the full value of the reverse bias voltage Vb appears across the diodes of the transfer switch 60 thereby providing a high level of noise immunity for the switch for the reasons previously discussed.

The negative bias voltage, Vb, for unit 60 can not be obtained from supply 40 since it is required that Vb be available when switch 42 is open. Voltage Vb could be provided by a battery or by an unswitched transformer coupled power supply. Such alternatives, however, suffer several disadvantages. Batteries, for example, present problems with regards to reliability and the need for servicing. A transformer coupled power supply would be highly inefficient for reverse biasing diodes since the output power that is required for this purpose is only a few micro-watts, at most, and is substantially less than the usual excitation losses of conventional transformers (e.g., hysteresis, eddy current and copper losses). The foregoing problems are avoided in unit 60 by means of transformerless power supply in unit 60 which provides the advantage of high efficiency in this low current bias application and the further advantage of suppression of common mode and differential mode components of noise or RF signals which may be present on line conductors 52 and 54 and which is also insensitive to the polarization of the power connector 50 with respect to the source of A.C. power (i.e., either of conductors 52 and 54 may be the A.C. neutral).

In more detail, the transformerless power supply comprises capacitors C6 and C7 connected in series between terminal 64 and ground to form a first capacitive potential divider and capacitors C8 and C9 connected in series between terminal 62 and ground to form a second capacitive potential divider. Reduced A.C. output voltages are produced at output nodes X and Y of the dividers. A divider ratio of about 20:1 for an A.C. supply of nominally 120 volts has been found suitable for reverse biasing diodes D1-D5. This voltage reduction may be obtained by appropriately scaling capacitors C6-C9, representative values being 0.001 microfarad for capacitors C6 and C8 and 0.02 microfarad for capacitors C7 and C9. It is desirable that capacitors C6-C9 be of a type having a relatively low equivalent series resistance (ESR) to maximize the voltage divider efficiency and that capacitors, C6 and C8 (which experience the greater portion of the A.C. voltage drop) be of a high voltage type suitable for connection directly to A.C. power distribution lines.

In addition to providing the function of A.C. line voltage reduction, the capacitive potential dividers also provide common-mode and differential-mode high frequency noise suppression for A.C. line conductors 52 and 54. Common-mode high frequency noise components which may be present on conductors 52 and 54 are coupled to ground by the respective dividers C8-C9 and C6-C7. Differential node high frequency noise components are effectively short circuited by the series connection of capacitors C6-C9 which provides a low impedance path directly between conductors 52 and 54 at high frequencies. The effectiveness of this radio frequency interference (RFI) suppression may be enhanced by adding inductance to the line conductors 52 and 54 if desired.

The output voltages at nodes X and Y are rectified and applied to node F where the rectified voltage is stored on a capacitor C10 coupled between node F and ground. Rectification is provided by diodes D6, D7 and D8 connected in series between node F and ground with the common connection of diodes D6 and D7 coupled to node Y via a current limiting resistor R6 and the common connection of diodes D7 and D8 coupled to node X via a current limiting resistor R7. Resistors R6 and R7 provide surge current or "spike" protection for the rectifier diodes and may have values on the order of a few thousand ohms or so.

Diodes D6-D8 are all poled in the same sense with respect to ground and form, in effect, a peak-to-peak detector which makes the output voltage at node F insensitive to where the ground of the A.C. line is referenced (i.e., either of conductors 52 or 54 may be the A.C. "neutral"). For example, if conductor 54 is ground (neutral), then no A.C. voltage appears at node X and the anode of diode D8 assumes a D.C. bias one diode drop above ground. Diodes D6 and D7 then form a peak-to-peak detector of the voltage on conductor 52 divided by the voltage divider C8-C9 with the detected negative DC voltage appearing across capacitor C10. If, on the other hand, conductor 52 is grounded (neutral), then diodes D7 and D8 detect the divided voltage from conductor 54 and the negative bias appears at the junction of capacitors C8 and C9 and is conducted to capacitor C10 via diode D6. For cases where neither conductor 52 and 54 is at ground potential, the same D.C. output voltage (Vb) is produced at node F, namely, the peak-to-peak value of the A.C. input voltage reduced by the attenuation factor (20:1) of the potential dividers C6-C7 and C8-C9.

Having considered supply 40 and control unit 60 separately, consideration will now be given to the overall combination which provides several unique advantages. One important advantage is that the A.C. to D.C. conversion efficiency of the combination is relatively high for either condition of power switch 42. When switch 42 is open, for example, there are no exciting current losses in transformer 42 and the relatively small current required to reverse bias diodes D1-D5 is provided with high efficiency by the capacitor coupled power supply in unit 60. When switch 42 is closed, the exciting losses in transformer 44 are relatively small as compared with the total power delivered to recovery unit 10, modulator 20 and switch 30 so that the transformer overall efficiency is relatively high.

Another advantage of the combination of supply 40 and unit 60 is that the use of transformer coupling and capacitor coupling provides D.C. isolation of the player from the A.C. power lines. This allows the chassis of the player to be grounded (via the antenna connector, for example) to avoid any potential shock hazard of a so-called "hot" chassis. Also, the power plug 50 need not be polarized since one potential divider will be effective for providing the diode bias current regardless of which power conductor is assumed to be the neutral as previously explained.

In certain applications it may be desired to provide a unipolar (rather than a bipolar) output signal at terminal 68 having a relatively high current capability when switch 42 is closed and a relatively low current capability when switch 42 is open. As an example, a unipolar output signal could be used to provide standby bias to retain data in a volatile computer memory when the computer is off. A unipolar (positive) output voltage at terminal 68 may be obtained by reversing the poling of diodes D6-D8. A negative unipolar output voltage may be obtained by reversing the connections of rectifier and filter unit 46 and replacing PNP transistor Q1 with an NPN transistor.

In FIG. 2 the player has been modified to provide remote control of RF transfer switch 30 and to improve RF isolation between the transfer switch and the power line conductors 52 and 54. The remote control feature enables the player to be on and in a standby mode of operation without causing interference to other RF signals coupled via switch 30 to the TV receiver. The RF isolation feature minimizes the potential problem of power line radiation of either the output of modulator 20 or of high level RF signals applied to input connector 34 (from a tape recorder, for example) and is provided by inserting a low pass filter in the circuit path (conductor 70) that supplies the control signal S4 to transfer switch 30. The filter comprises a pair of capacitors C11 and C12 coupled between ground and respective ones of terminals 68 and 38 and a ferrite bead (FB). Conductor 70 is threaded through the ferrite bead to increase the inductance of the control signal path. Capacitors C11 and C12 bypass RF signals to ground at each end of the path (suitable values being 0.001 microfarad, each). The combination of capacitors C11 and C12 and the inductor FB forms an L-C filter having a cut-off frequency substantially less than the frequency of modulator 20.

The remote control modification comprises connecting resistor R4 between the base of transistor Q1 and a remote control signal input terminal 61, coupling the emitter of transistor Q1 to terminal 66 via the base-emitter path of a further PNP transistor Q2 and connecting the collector of transistor Q2 to an output terminal 63 which, in turn, is connected to the power input terminal 22 of modulator 20.

To enable normal playback of a disc, power switch 42 is closed and a ground level remote control signal is applied to terminal 61 thereby turning transistor Q1 and Q2 on. Transistor Q1 supplies forward bias to the transfer switch diodes as previously explained thereby coupling the output of modulator 20 to connector 36 and transistor Q2 supplies operating power to modulator 20 to produce the RF output signal S3. When it is desired to interrupt the playback and switch to another source of RF signal, transistors Q1 and Q2 are turned off by application of a high level positive voltage (e.g. Vs) to terminal 61. Turn-off of transistor Q1 enables the negative voltage at node F to reverse bias the transfer switch diodes thereby interrupting the path between input terminal 32 and output connector 36 and completing the path between connectors 34 and 36. With an auxilliary source of RF signal applied to connector 36, the turn off of transistor Q2 disables modulator 20 to prevent possible interference between the auxilliary RF signal and the modulator output signal S3. This potential problem exists because diode D1 has a small but finite junction capacitance (as is characteristic of all known diodes) and is connected in a series RF signal path in switch 30. Thus, even where reverse biased, the impedance of diode D1 is not infinite at RF frequencies and a portion of the signal S3 could be coupled through diode D1 to connector 36. This possibility is prevented by transistor Q2 which interrupts the supply of operating power for modulator 20 when turned off.

What is claimed is:

1. Apparatus, comprising:
    a pair of supply lines for connection to a source of A.C. power;
    a power switch, subject to switching between open and closed conditions;
    power supply means coupled to said supply lines via said power switch for providing a D.C. supply voltage when said power switch is in said closed condition;
    RF signal source means responsive to said D.C. supply voltage for providing an RF output signal within a predetermined frequency band;
    RF transfer switch means having a first circuit path for coupling said RF output signal to an RF output connector and a second circuit path for coupling an RF input connector to said RF output connector, the first path including a series connected diode means, the second path including a shunt connected diode means; and
    control means for applying a forward bias signal to each diode means in each path when said power switch is in said closed condition and for applying a reverse bias signal to each diode means in each path when said power switch is in said open condition.

2. Apparatus as recited in claim 1 further comprising high pass filter means interposed in said second circuit path.

3. Apparatus as recited in claim 2 where in said high pass filter means is of a type having at least one inductive element, said inductive element being connected between said RF input connector and a point of reference potential for providing a direct current conductive path there between.

4. Apparatus as recited in claim 1 further comprising means for establishing a predetermined relationship between the forward bias signal applied to a given diode means in one of said paths and the forward bias signal applied to another diode means in the other of said paths.

5. Apparatus as recited in claim 1 further comprising a third circuit path for coupling said forward and reverse bias signals from said control means to said RF transfer switch means and low pass filter means interposed in said third circuit path.

6. Apparatus as recited in claim 5 wherein said low pass filter means includes at least one inductor-capacitor section having a cut-off frequency selected to provide attenuation of signals within the third path having frequency components within said predetermined frequency band.

7. Apparatus as recited in claim 1 wherein said control means comprises means for developing a bi-polar control signal having a first polarity when said D.C. supply voltage is non-zero and a second polarity when said D.C. supply voltage is substantially equal to zero; and means for applying said bi-polar control signal to a control terminal of said RF transfer switch means.

8. Apparatus as recited in claim 7 wherein said control means further comprises means for reversing the polarity of said bi-polar control signal when said D.C. output voltage is non-zero and for concurrently disabling said RF signal source means.

9. Apparatus as recited in claim 7 wherein said means for developing said bi-polar control signal comprises:
    a source for providing a D.C. reference voltage having a polarity opposite to said D.C. supply voltage of said power supply means, said D.C. reference voltage being independent of the condition of said power switch;
    an output terminal for providing said bi-polar control signal;
    current limiting means for continuously applying said D.C. reference voltage to said output terminal; and
    means for applying said D.C. supply voltage to said output terminal when said D.C. supply voltage is present and for isolating said output terminal from said power supply means when said D.C. supply voltage is substantially zero.

10. Apparatus as recited in claim 9 further comprising means responsive to a first level of a logic input signal supplied thereto for inhibiting application of said D.C. supply voltage to said output terminal and responsive to a second level of said logic input signal for enabling said application of said D.C. supply voltage to said output terminal.

11. Apparatus as recited in claim 10 further comprising means responsive to said first level of said logic input signal for disabling said RF signal source means and responsive to said second level of said logic input signal for enabling said RF signal source means.

12. Apparatus as recited in claim 1 wherein said second circuit path comprises high pass filter means having an input node connected to said RF input connector, an output node connected to said RF output connector and wherein said shunt connected diode means comprises at least one semiconductor diode connected between an intermediate node or the output node of said high pass filter means and a point of reference potential.

* * * * *